United States Patent [19]
Mori et al.

[11] Patent Number: 5,551,785
[45] Date of Patent: Sep. 3, 1996

[54] DIVISIONALLY-PRINTABLE LABEL PRODUCING APPARATUS

[75] Inventors: Masaharu Mori, Anjo; Hideo Ueno, Nagoya; Kazuhisa Hirono, Nagoya; Akihiko Niwa, Nagoya, all of Japan

[73] Assignee: Brother Kogyo Kabushiki Kaisha, Nagoya, Japan

[21] Appl. No.: 505,968

[22] Filed: Jul. 24, 1995

[30] Foreign Application Priority Data

Aug. 10, 1994 [JP] Japan .................................. 6-188354

[51] Int. Cl.⁶ ..................................................... B41J 5/31
[52] U.S. Cl. .......................... 400/76; 400/62; 400/615.2
[58] Field of Search .............................. 400/4, 9, 61, 62, 400/70, 76, 582, 586, 615.2, 323, 279

[56] References Cited

U.S. PATENT DOCUMENTS

| | | |
|---|---|---|
| 4,948,279 | 8/1990 | Ikoma et al. .............................. 400/279 |
| 5,399,030 | 3/1995 | Niwa et al. .................................. 400/3 |

Primary Examiner—John S. Hilten
Attorney, Agent, or Firm—Oliff & Berridge

[57] ABSTRACT

When an enlargement print key is pressed, a label producing apparatus enters a mode for setting the enlargement magnification used for enlargement printing. Next, a number key is operated to actually set the enlargement magnification. After the creation of print image data, respective data are taken from a table in which the respective data about widths of printing tapes, the number of printing tape segments based on width of tape and enlargement magnification, and "an enlargement start bit position," "an enlargement end bit position," "an enlargement work start bit position 1," "an enlargement work start bit position 2" and "the number of shifts for adjustment" with respect to each tape width which have been specified to thereby create one-dot string data. When it is desired, for example, to scale up and print data associated with a 12-mm tape width in 3× magnification, the enlargement print data is printed on the corresponding printing tape by being divided into three at 12-mm width intervals. Thus, the divided printing can be performed using a plurality of segments of the printing tape having a width that is less than the character size to be printed.

20 Claims, 16 Drawing Sheets

Fig. 4B

| | START MAIN PROCESS |
|---|---|
| STEP | ACTION |
| S10 | INITIALIZE VARIOUS DATA, INITIALIZE EDIT SCREEN |
| S20 | KEY INPUT ? |
| S30 | IS ENLARGEMENT PRINT KEY OPERATED ? |
| S40 | IS ENLARGEMENT PRINT FLAG ON ? |
| S50 | SET ENLARGEMENT PRINT FLAG ON |
| S60 | SET ENLARGEMENT PRINT FLAG OFF |
| S70 | IS NUMBER KEY OPERATED ? |
| S80 | IS ENLARGEMENT PRINT FLAG ON ? |
| S90 | KEY PROCESSING |
| S100 | SET ENLARGEMENT MAGNIFICATION |
| S110 | IS RETURN KEY OPERATED ? |
| S120 | IS ENLARGEMENT PRINT FLAG ON ? |
| S130 | KEY PROCESSING |
| S140 | ENLARGEMENT PRINT |
| S150 | OTHER KEY PROCESSING |

Fig. 5B

| STEP | ACTION |
|---|---|
| S140 | START ENLARGEMENT PRINT PROCESS |
| S210 | CREATE PRINT IMAGE DATA |
| S220 | SET NUMBER OF ENLARGEMENT PRINTING LINES |
| S230 | FIRST SEGMENT FROM PRINTING TAPE ? |
| S240 | JUDGE PRINTING TAPE |
| S250 | TAKE OUT DATA ABOUT ENLARGEMENT START BIT POSITION, ENLARGEMENT END BIT POSITION, ENLARGEMENT WORK START BIT POSITION 1, ENLARGEMENT WORK START BIT POSITION 2 AND THE NUMBER OF SHIFTS FOR ADJUSTMENT BASED ON TAPE WIDTH AND THE PRESENT SEGMENT NUMBER OF THE PRINTING TAPE, AND SET THE DATA TO THEIR CORRESPONDING WORKS |
| S260 | CREATE ONE-DOT STRING DATA |
| S270 | PRINT ONE-DOT STRING |
| S280 | IS MAGNIFICATION-CORRESPONDING LOOP FINISHED ? |
| S290 | ARE ALL THE LINES PRINTED ? |
| S300 | INCREMENT PRESENT SEGMENT NUMBER OF THE PRINTING TAPE BY 1 |
| S310 | SEGMENT NUMBER OF THE PRINTING TAPE < ENLARGEMENT MAGNIFICATION ? |
|  | RETURN |

Fig. 6B

| STEP | ACTION |
|------|--------|
| S260 | START CREATION OF ONE-DOT STRING DATA |
| S410 | CLEAR ENLARGEMENT WORKING AREAS WORK1, WORK2 BY 16 BYTES |
| S420 | SET DATA CORRESPONDING TO ONE LINE TO WORK1 |
| S430 | ENLARGEMENT DATA AT ENLARGEMENT START BIT POSITION OF WORK1 TO ENLARGEMENT MAGNIFICATION AND PLACE IT FROM WORK START BIT POSITION 1 OF WORK2 |
| S440 | DECREMENT ENLARGEMENT START BIT POSITION BY 1 |
| S450 | ENLARGEMENT START BIT = ENLARGEMENT END BIT ? |
| S460 | REDUCE WORK START BIT POSITION 1 BY NUMBER OF ENLARGEMENT MAGNIFICATIONS |
| S470 | NUMBER OF SHIFTS FOR ADJUSTMENT > 0 ? |
| S480 | SHIFT DATA FROM POSITION WHERE NUMBER OF SHIFTS FOR ADJUSTMENT IS SUBTRACTED FROM WORK START BIT POSITION 2 TO WORK START BIT POSITION 2 ON WORK2 SIDE. |
| S490 | SET ALL AREAS OTHER THAN PRINTING AREA IN WORK2 TO 0 DATA |
| S500 | TRANSFER DATA IN WORK2 TO THERMAL HEAD |
|      | RETURN |

Fig.7

| TAPE WIDTH (mm) | MAGNI- FICATION (x) | TAPE ORDER | ENLARGE- MENT START BIT | ENLARGE- MENT END BIT POSITION | ENLARGEMENT WORK START BIT POSITIONS 1, 2 | NUMBER OF SHIFTS FOR ADJUSTMENT |
|---|---|---|---|---|---|---|
| 6 | 2 | 1 | | | | |
| | | 2 | | | | |
| | 3 | 1 | | | | |
| | | 2 | | | | |
| | | 3 | | | | |
| | 4 | 1 | | | | |
| | | 2 | | | | |
| | | 3 | | | | |
| | | 4 | | | | |
| 9 | 2 | 1 | | | | |
| | | 2 | | | | |
| | 3 | 1 | | | | |
| | | 2 | | | | |
| | | 3 | | | | |
| | 4 | 1 | | | | |
| | | 2 | | | | |
| | | 3 | | | | |
| | | 4 | | | | |
| 12 | 2 | 1 | | | | |
| | | 2 | | | | |
| | 3 | 1 | | | | |
| | | 2 | | | | |
| | | 3 | | | | |

Fig.9

| TAPE WIDTH (mm) | PRINT DATA | TAPE ORDER | DIVISION START BIT POSITION | DIVISION END BIT POSITION | DIVISION WORK START BIT POSITIONS 1, 2 | NUMBER OF SHIFTS FOR ADJUSTMENT |
|---|---|---|---|---|---|---|
| 6 | 24 mm | 1 | | | | |
| | | 2 | | | | |
| | | 3 | | | | |
| | | 4 | | | | |
| | 18 mm | 1 | | | | |
| | | 2 | | | | |
| | | 3 | | | | |
| | 12 mm | 1 | | | | |
| | | 2 | | | | |
| 9 | 18 mm | 1 | | | | |
| | | 2 | | | | |
| 12 | 24 mm | 1 | | | | |
| | | 2 | | | | |

DIVISIONALLY-PRINTABLE LABEL PRODUCING APPARATUS

BACKGROUND OF THE INVENTION

1. Field of the Invention

The invention relates to a label producing apparatus for printing a relatively simple character string or the like on an elongated printing medium having a predetermined width so as to produce labels, and particularly to a label producing apparatus having a divisional-printing function when a medium to be printed fit for the character size to be printed is absent.

2. Description of the Related Art

A label producing apparatus has heretofore been known which is capable of printing characters such as letters and symbols, on an elongated medium having a predetermined width. As the medium to be printed used in this type of label producing apparatus, there are a plurality of tapes having different widths. Characters can be printed on a printing medium having a desired width according to the purpose.

However, a medium to be printed, which is fit for a character size to be printed, may not necessarily be present in the apparatus. Now, consider a label producing apparatus capable of setting a desired printing width while respectively exchanging the actual medium to be printed among those having widths of "6 mm," "9 mm," "12 mm," "18 mm" and "24 mm," for example. If a printing medium having a width of 24 mm is absent when print data printable on a 24-mm width printing medium is created, then the print data cannot, in practice, be printed.

When only print data associated with, for example, a printing medium having a 24-mm width, of the printing mediums having the five different widths, is frequently created and print data related to other tape widths are not created as often, the printing mediums having the mounted widths of tape other than the 24 mm width can't be used properly and must be changed, if available, to 24 mm, thus resulting in inefficiencies.

Thus, when a printing medium fit for a character size to be printed is not present, for example, when the enlarged print data is greater than the maximum width of the available printing medium and when a printing data that originally has a width wider than the loaded printing medium, the print data cannot be printed in its original form.

SUMMARY OF THE INVENTION

In view of the foregoing problems, it is therefore an object of the invention to provide a label producing apparatus capable of divisionally printing the print data using a plurality of successive segments or portions of a printing medium having a width less than a width necessary for the character size to be printed to thereby maximize use of the printing mediums and even print data greater in height than the maximum width of the available printing medium.

According to one aspect of the invention for achieving the above object, there is provided a label producing apparatus having character data inputting means for inputting data about characters, such as letters, numbers and symbols, and storing means for storing therein the character data input by the character data inputting means, the apparatus capable of exchangeably loading therein mediums to be printed having a plurality of different widths and printing the character data stored in the storing means on the installed printing medium, comprising print image developing means for developing the character data stored in the storing means into print image data, printing-medium width detecting means for detecting a width of the medium to be printed present in the label producing apparatus, and division printing means for dividing the print image data developed by the print image developing means so as to correspond to the width of the printing medium present in the label producing apparatus and printing each divided print image data segment on the present printing medium.

The label producing apparatus further comprises print position information storing means for storing therein information about a print start position and a print end position for each divided print image data segment when print data having a predetermined width is divisionally printed on the present printing medium. The division printing means reads the information about the print start position and the print end position for each print image data segment divided so as to correspond to the width of the printing medium present in the label producing apparatus, from the print position information storing means and prints the print image data on the corresponding printing medium based on the information.

The label producing apparatus still further comprises enlargement print specifying means for specifying enlargement printing using an operator input, which may be to limited values, predetermined enlargement magnification and print position information storing means for storing therein information about a print start position and a print end position for each divided image data segment when the print data after enlargement by the predetermined enlargement magnification is to be divisionally printed on a narrower printing medium. The division printing means reads the information about the print start position and the print end position for each print image data segment divided so as to correspond to the width of the printing medium present in the label producing apparatus from the print position information storing means and prints the print image data segments on the corresponding printing medium based on the information.

According to the label producing apparatus of the invention, when the data about the characters, such as the letters and symbols are input by the character data inputting means, the character data are stored in the storing means. Further, one of a plurality of printing mediums having different widths is loaded in the label producing apparatus and the character data stored in the storing means can be printed on the printing medium present.

The print image developing means develops the character data stored in the storing means into the print image. The division printing means divides the data of the developed print image so as to correspond to the width of the printing medium that is present in the label producing apparatus and prints the data on the printing medium at each divided print image data segment.

The width of the printing medium present in the label producing apparatus is detected by a printing-medium width detecting means. The printing medium having a given width is loaded in advance. A decision is made as to which printing medium width is to be set based on the loaded printing medium.

As described above, the division printing means prints the print data on the present printing medium as print image data segments divided so as to correspond to the width of the printing medium. Therefore, even if a printing medium having a width of 24 mm is absent when print data printable on a 24-mm wide printing medium is created, the print data can be printed on two successive segments of a loaded printing tape having a width of 12 mm or four successive segments of a loaded printing tape having a width of 6 mm.

Thus, even when only print data normally associated with and printed on a 24-mm wide tape, for example, is frequently created, any one of the printing mediums having, for example, one of five different widths, such as "6 mm," "9 mm," "12 mm," "18 mm" and "24 mm" can be loaded into the label producing apparatus, and the printing tapes having a width other than the 24-mm width can be used for printing. Hence the loaded printing tape can be used without a need to change tapes thereby increasing convenience and simplicity for the user.

According to the label producing apparatus, the print position information storing means stores therein the information about the print start position and the print end position for each divided print image data segment when the print data having the predetermined width is divisionally printed on the loaded printing medium. The division printing means reads the information about the print start position and the print end position for each print image data divided so as to correspond to the width of the printing medium loaded in the label producing apparatus at present from the print position information storing means and prints the print image data on the corresponding printing medium based on the information.

When large character data, say 24 mm high, is input and the 24 mm wide printing tape is not present, the division printing is performed, for example, using a plurality of the 12 mm wide or the 6 mm wide printing tape segments as present. However, the division printing can also be executed when smaller character data is enlarged such that its height is greater than the mounted tape width, the enlargement can be specified or designated using an enlargement print specifying means.

The print position information storing means stores therein the information about the print start position and the print end position for each divided image data segment when the print data at the time of the enlargement printing in the predetermined enlargement magnification is divisionally printed on the printing medium present. Further, the division printing means reads the information about the print start position and the print end position for each print image data segment divided so as to correspond to the width of the printing medium present in the label producing apparatus from the print position information storing means and prints the print image data on the corresponding printing medium based on the information.

When it is desired to create print data corresponding to a 12-mm tape width, for example, and scale it up by a 3× magnification, it is necessary to divisionally print the data on three successive segments of the printing tape since each segment has a width of 12 mm. This is because a medium having a width of 36 mm is not included in the available printing mediums.

Thus, even when a printing medium appropriate to a desired character size for printing is absent, e.g., when the enlarged print data is greater than the maximum width of a loaded printing medium, the label producing apparatus of the invention can perform divisional printing allowing the use of a plurality of printing mediums having widths other than the width appropriate for the character size to be printed. That is, with the invention, what is printed on the tape may be cut off to produce segments that are pieces of a label that may be then assembled to form the label. As a result, the printing tapes can be effectively used and even print data greater than the maximum width of the loaded printing medium can be printed.

The above and other objects, features and advantages of the invention will become apparent from the following description and the appended claims, taken in conjunction with the accompanying drawings in which a preferred embodiment of the invention is shown by way of illustrative example.

BRIEF DESCRIPTION OF THE DRAWINGS

FIG. 4B is a table of labels for FIG. 4A;

FIG. 5B is a table of labels for FIG. 5A;

FIG. 6B is table of labels for FIG. 6A;

FIG. 7 is a table showing data appropriate to various widths of printing tapes and enlargement magnification factors;

FIG. 9 is a table illustrating data appropriate to various widths of printing tapes and widths of created print data;

DETAILED DESCRIPTION OF THE PREFERRED EMBODIMENTS

A preferred embodiment of the label producing apparatus according to the invention will be described with reference to the accompanying drawings.

The embodiment is applied to a label producing apparatus 1 capable of printing many characters, such as Chinese characters or kanji, hiragana or kana characters, alphabetic characters and symbols, on a printing tape (medium to be printed) 5.

Figure 1:
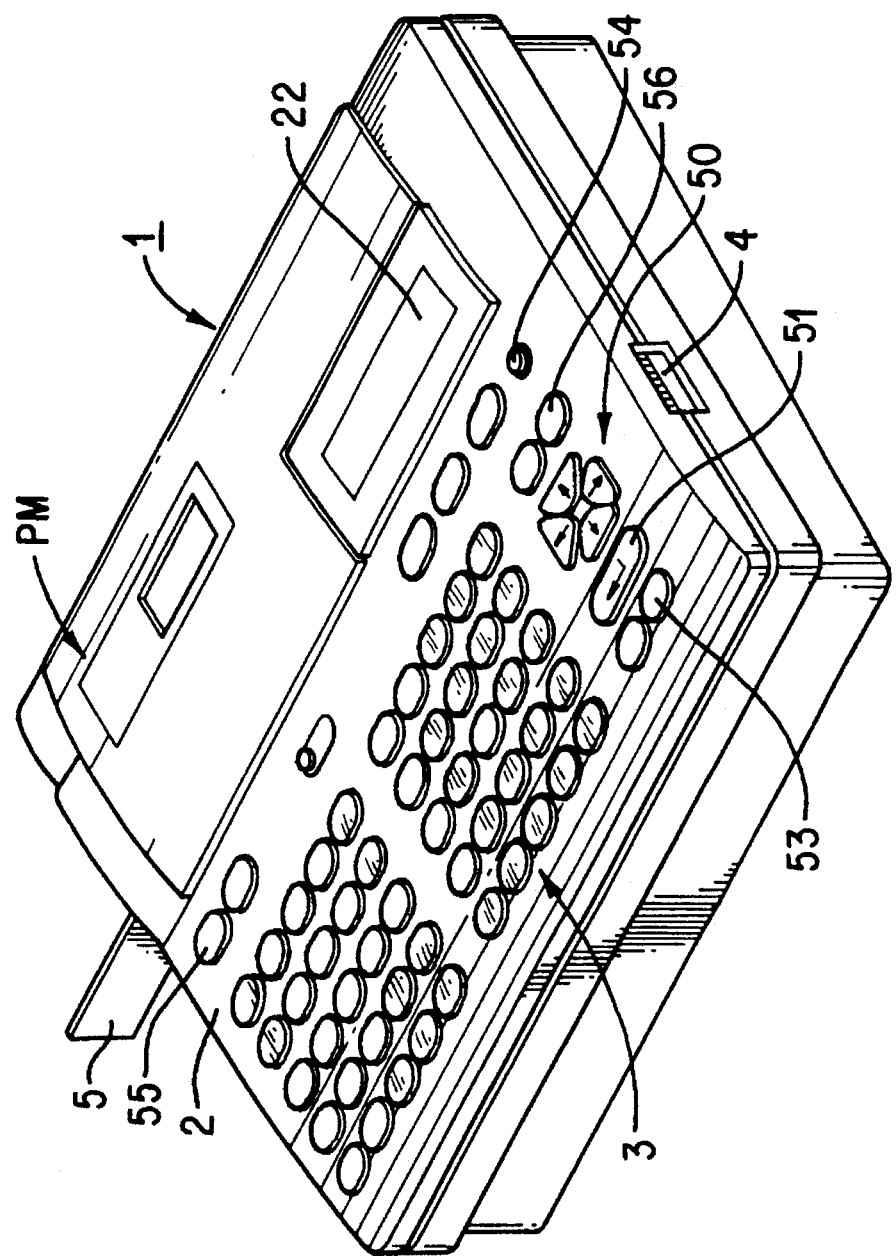
FIG. 1 is a perspective view showing a label producing apparatus according to an embodiment of the invention.

As shown in FIG. 1, a keyboard 3 is provided in a front portion of a body frame 2 of the label producing apparatus 1. A print mechanism PM is provided within the body frame 2 to the rear of the keyboard 3. A liquid crystal display (LCD) 22, capable of displaying characters, numbers and symbols, is provided behind the keyboard 3. A terminal 4 of an interface (RS232C) for receiving data transmitted from an external device is provided on the right side of the body frame 2.

Figure 1A:
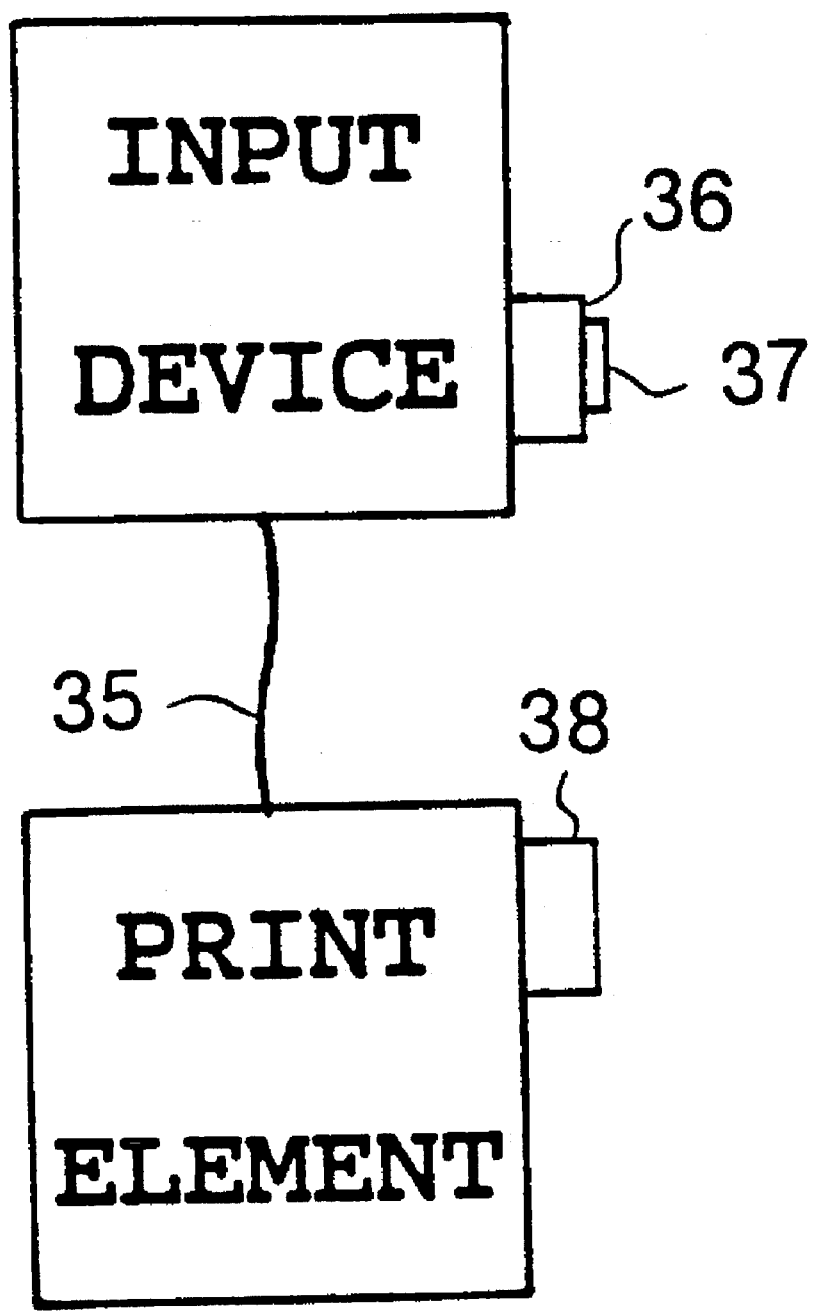
FIG. 1A is an alternative structure for the label producing device.

The keyboard 3 includes character input keys for inputting characters, such as alphabetic letters, numbers and symbols; cursor shift keys 50 for displacing a cursor in the vertical and the horizontal directions; a return key 51 for starting a new line, making a decision or instructing execution; an enlargement print key 53 for selecting an enlargement magnification setting mode to execute enlargement printing; a power key 54 for turning the power ON and OFF; a print key 55 for executing printing; and a delete key 56 for deleting input data. Other keys may be present but are not necessary to a description of the invention. Data inputted in the form of alphabetic letters can be converted to any of kanji, hiragana, and katakana characters, for example, by a convert key. The keyboard 3 corresponds to a character data inputting means and an enlargement print specifying means employed in the invention. Alternatively, the input elements could be in a first housing connected by cable 35 to a printer in a second housing (FIG. 1A). Further, the input means may include a read/write device 36 for writing to a removable memory element 37.

Figure 2:
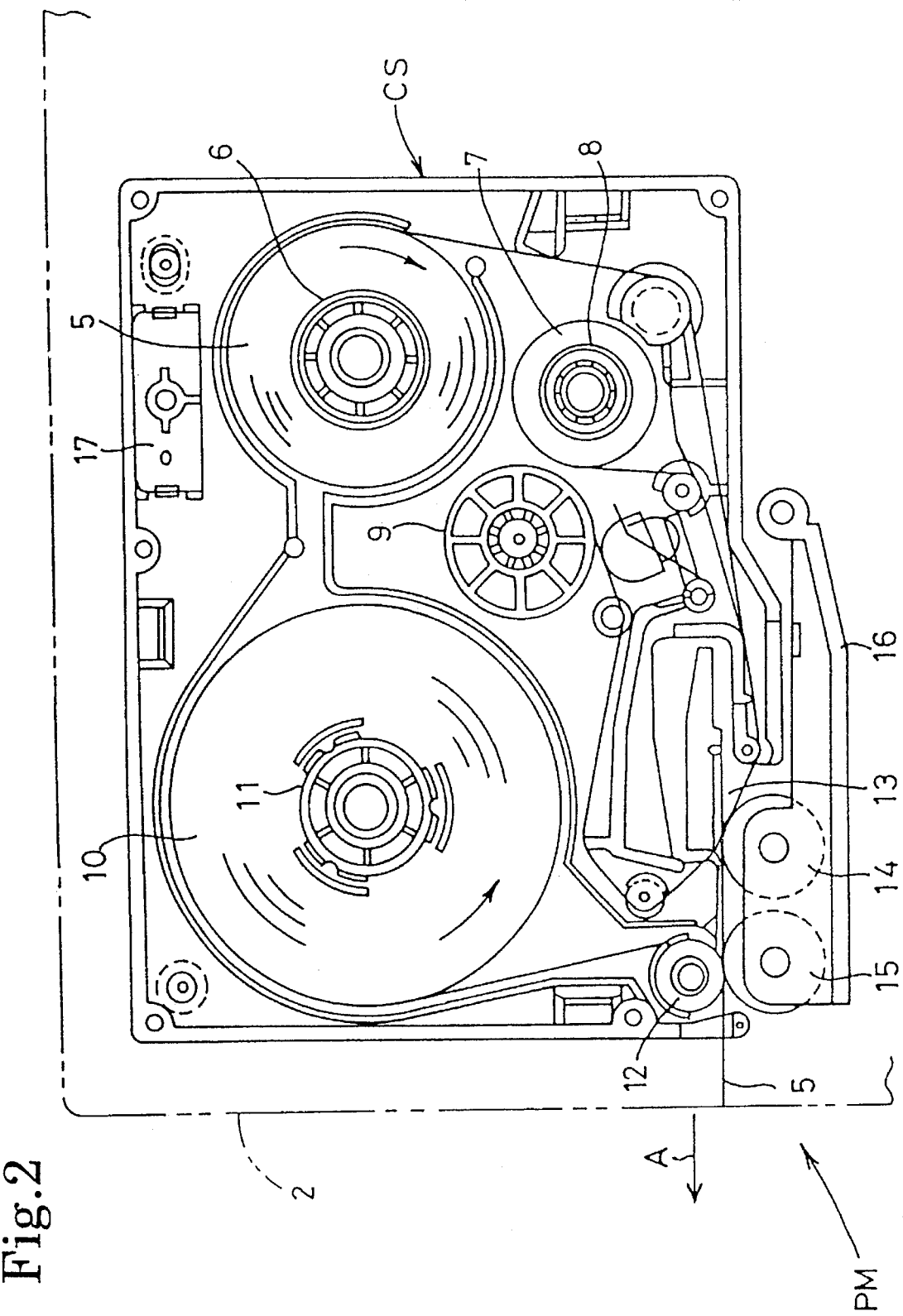
FIG. 2 is a schematic plan view showing a print mechanism of the label producing apparatus shown in FIG. 1.

The print mechanism PM will be described with reference to FIG. 2. A rectangular tape holding cassette CS is removably mounted to the print mechanism PM. A tape spool 6 on which a printing tape 5 composed of a transparent film of a given width, for example 24 mm, is wound; a ribbon supply spool 8 on which an ink ribbon 7 is wound; a take-up or winding spool 9 for winding the ink ribbon 7 thereon; a supply spool 11 on which a double coated tape 10 having the same width as that of the printing tape 5 is wound with its release paper placed outside; and a junction roller 12 for joining the printing tape 5 and the double coated tape 10 to each other are rotatably provided within the tape holding cassette CS.

A thermal head 13 is vertically located in a position where the printing tape 5 and the ink ribbon 7 overlap each other. A platen roller 14, for pressing the printing tape 5 and the ink ribbon 7 against the thermal head 13, and a feed roller 15, for pressing the printing tape 5 and the double coated tape 10 against the junction roller 12, are rotatably supported by a support 16. The thermal head 13 is provided with a heat-producing element group composed of 128 heat-producing elements arranged in a row that extends across the width of the printing tape 5 so as to substantially correspond to a 24-mm wide printing tape 5.

Thus, when the 128 heat-producing elements are energized, while the junction roller 12 and the take-up roller 9 are being driven in a predetermined direction of rotation in synchronism with each other under the driven action of a tape feed motor 24 (see FIG. 3), characters and bit images are printed on the printing tape 5 to its substantially fullest width by a plurality of dot strings (128 dots at a maximum). Further, the printing tape 5 is fed in a tape feeding direction A and joined to the double coated tape 10.

A cassette discrimination member 17 for setting the type of the tape holding cassette CS, i.e., the width of the printing tape 5 held therein, is mounted on a bottom wall of the tape holding cassette CS. A cassette discrimination sensor 18 (see FIG. 3) comprised of a photointerrupter for detecting a projection (not shown) attached to the cassette discrimination member 17 is mounted to the body frame 2. Alternatively, a switch could be provided enabling the user to input the tape width. Accordingly, the width of the printing tape 5 can be detected based on a discrimination signal produced from the cassette discrimination sensor 18. Various tape holding cassettes CS, in which printing tapes 5 having widths of "6 mm," "9 mm," "12 mm" and "18 mm" are wound, are available and usable in addition to one holding a "24 mm" printing tape.

The tape holding cassettes CS, which accommodate the printing tapes 5 having the widths other than the 24-mm width therein, can be loaded into the label producing apparatus 1 in the same manner as the tape holding cassette CS accommodating the printing tape 5 having the 24-mm width. By specifying which heat-producing elements of the heat-producing element group should be heated according to the width of each printing tape 5, data are printed on the loaded printing tape 5 to its substantially fullest width.

Figure 3:
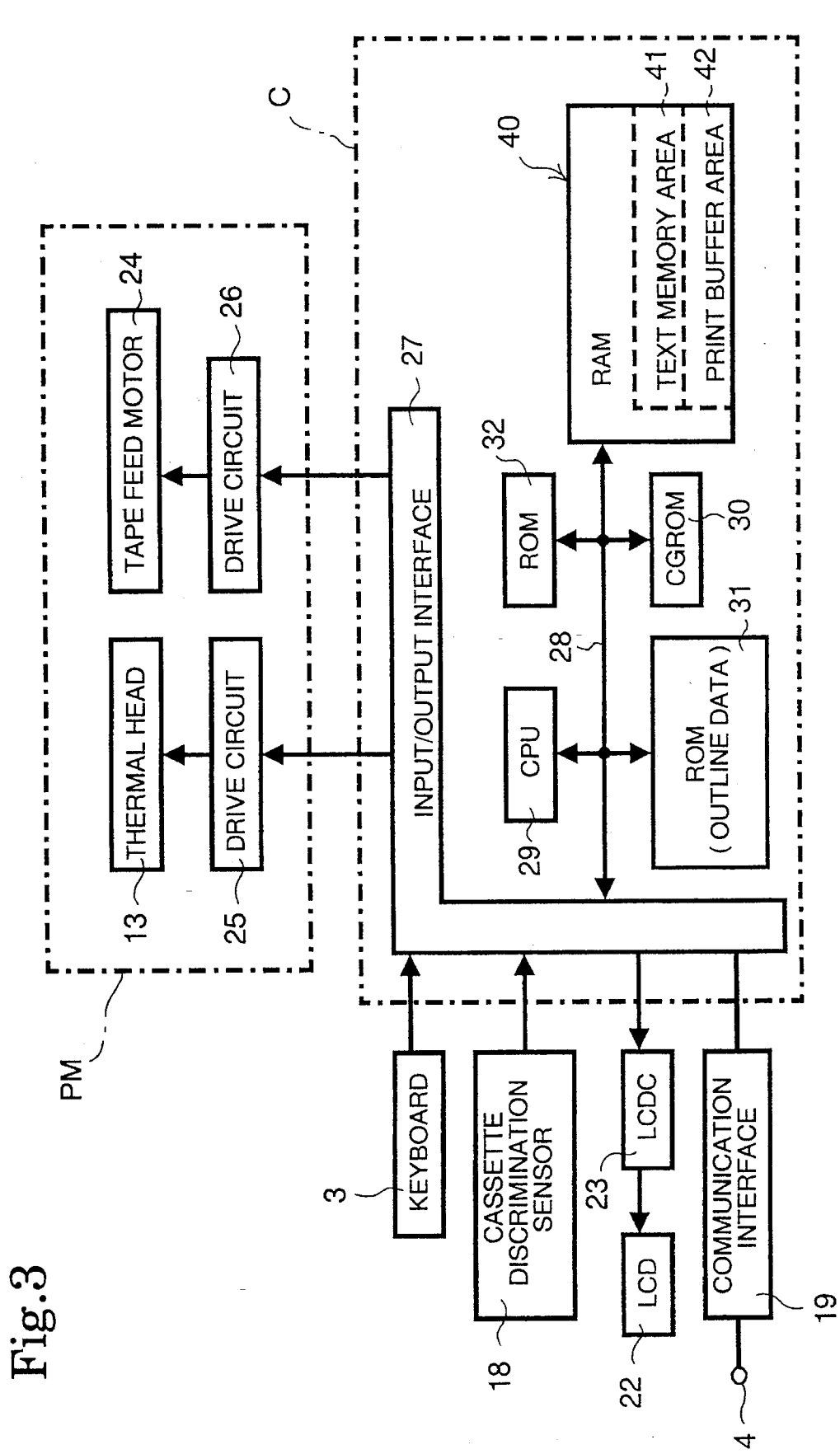
FIG. 3 is a block diagram illustrating a control system of the label producing apparatus shown in FIG. 1.
Figure 4A:
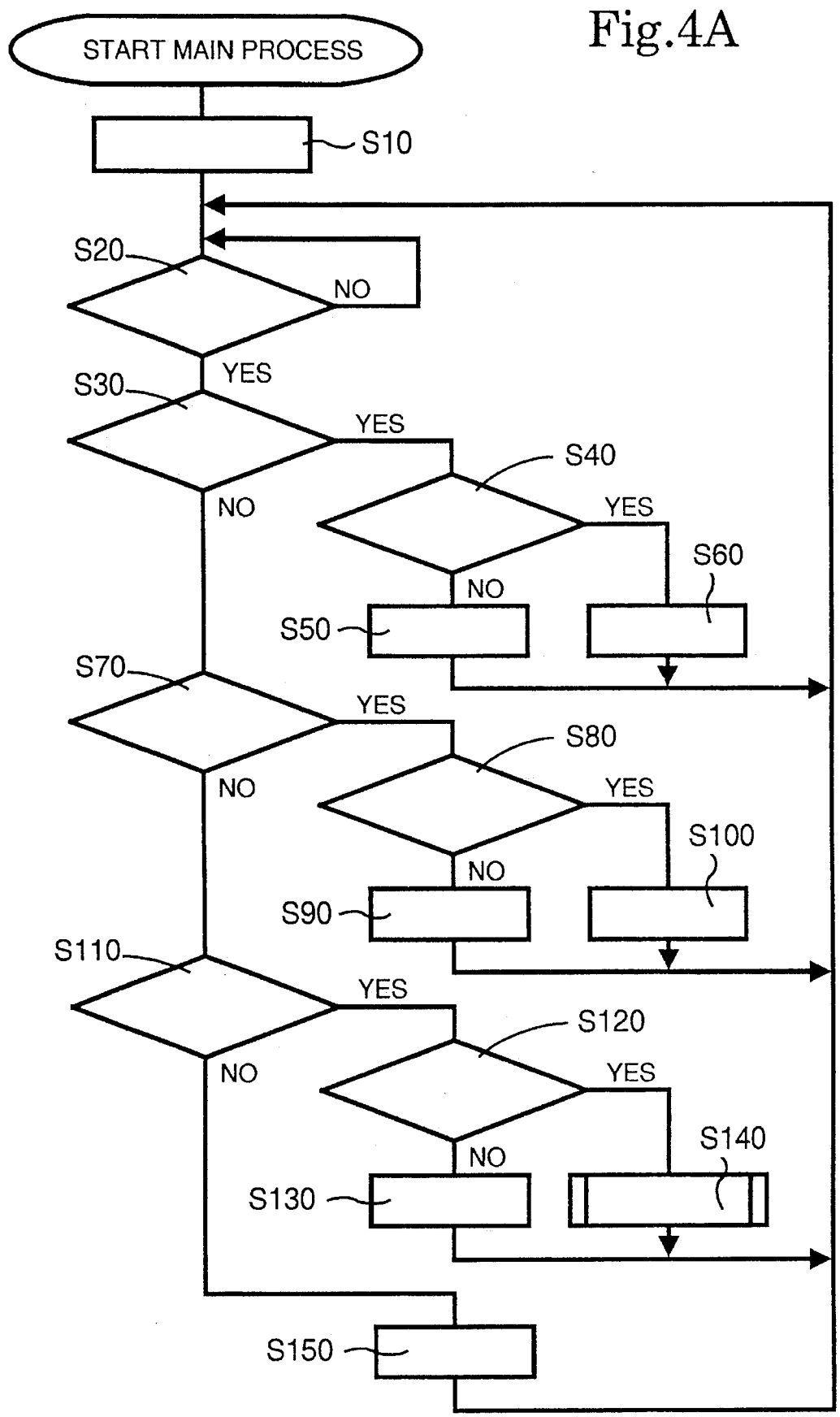
FIG. 4A is a flowchart for describing a main process executed by the label producing apparatus shown in FIG. 1.

The control system of the label producing apparatus 1 is shown as a block diagram in FIG. 3. The keyboard 3, the cassette discrimination sensor 18, a display controller (LCDC) 23 having a display RAM for outputting display data to the liquid crystal display (LCD) 22, the communication interface 19 for receiving data transmitted from the external device, a drive circuit 25 for driving the thermal head 13 and a drive circuit 26 for driving the tape feed motor 24 are respectively electrically connected to an input/output interface 27 of a control device C. The control device C comprises a CPU 29, the input/output interface 27, a CGROM 30, ROMs 31 and 32 and a RAM 40.

Dot pattern data for displaying the many characters are stored in the CGROM (pattern data memory) 30 appropriate to the input code data.

Outline data for specifying outlines of the characters for a plurality of fonts or types (such as Gothic type and Ming type) are stored in the ROM (outline data memory) 31 for use with the input code data. Each of the outline data includes longitudinal and transverse dimensions of the image to be printed.

The RAM 40 stores tables as shown in FIGS. 7 and 9. As shown in FIG. 7, numeric values of four items comprising "an enlargement or enlargement start bit position," "an enlargement end bit position," "enlargement work start bit positions 1, 2" and "the number of shifts for adjustment" are stored in the RAM 40 for each tape order for printing (i.e., as in the case of a first printed segment and a second printed segment for 6 mm sized characters subjected to a 2× magnification) corresponding to permissible data enlargement magnifications (2×, 3×, 4×) for each of the respective widths (such as 6 mm, 9 mm, 12 mm, 18 mm and 24 mm) of printing tapes 5. Incidentally, the enlargement work start bit position 1 and the enlargement work start bit position 2 are of the same numeric value but are different in meaning from each other. Actual values are omitted in FIG. 7. A description of the detailed contents of the four items of the table will be described later for a better understanding.

In the table shown in FIG. 9, numeric values of four items comprising "a division start bit position," "a division end bit position," "division work start bit positions 1, 2" and "the number of shifts for adjustment" are stored for each tape order for printing (e.g., as in the case of first through fourth printing orders or segments when the width of the printing tape 5 is 6 mm and print data is 24 mm) corresponding to the possible combinations of created print data (e.g., 24 mm, 18 mm and 12 mm when the width of the printing tape 5 is 6 mm) that are an integral multiple of the width of the printing tape 5 (i.e., 6 mm, 9 mm, 12 mm, 18 mm and 24 mm). The division work start bit position 1 and the division work start bit position 2 are identical in numeric value to each other but are different in meaning from each other. Further, the values are omitted from FIG. 9 as a detailed description of the contents of the four items will be described later and make them easier to understand. Thus, the RAM 40 corresponds to a print position information storing means.

Referring back to FIG. 3, programs for activating the label producing apparatus 1 are stored in the ROM 32. Further, character data inputted via the keyboard 3 are stored in a text memory area 41 of the RAM 40. Data of the image-developed print dot patterns are stored in a print buffer area 47 that constitutes a part of a print image developing means. Further, a work area for temporarily storing therein the results of computations by the CPU 29 and areas used for a buffer, a counter, a pointer, and similar working data are provided in the RAM 40.

The operation of the label producing apparatus 1 will be described with reference to flowcharts of FIGS. 4A through 6B. The main process will first be described with reference to FIGS. 4A,4B.

When the power key 54 is operated to turn the power ON and a tape holding cassette CS is loaded in the label producing apparatus 1, the label producing apparatus 1 starts to operate.

When the label producing apparatus 1 starts to operate, it initializes respective data stored in the RAM 40 as well as an edit screen in accordance with the programs stored in the ROM 32 (Step S10, Step will hereinafter be abbreviated simply "S"). In the embodiment, two lines can be displayed on the liquid crystal display 22 at a maximum. When they are initialized, a line head mark and a cursor are initially displayed on the liquid crystal display 22.

It is next determined or judged whether a key input has been made via the keyboard 3 (S20). If a key input is given at S20, the routine passes through S20. If the detected key input is found to be an operation of the enlargement print key 53 (if the answer is YES at S30), it is then determined whether an enlargement print flag is ON (S40). If the answer is NO at S40, then the enlargement print flag is set ON (S50). On the other hand, if the answer is YES at S40, then the enlargement print flag is set OFF (S60) and the routine returns to S20. Once the enlargement print key 53 is pressed in accordance with the processing of S30 through S50, the label producing apparatus 1 enters into a mode for setting an enlargement magnification for performing enlargement printing (i.e., the enlargement print flag is set ON). When the enlargement print key 53 is pressed again (S30 through S60), the label producing apparatus 1 is released from the enlargement magnification setting mode (i.e., the enlargement print flag is set OFF).

If the detected key input is found not to be the operation of the enlargement print key 53 (if the answer is NO at S30), it is then judged whether a number key has been operated (S70). If the answer is YES at S70, it is then determined whether the enlargement print flag is ON (S80). If the answer is NO at S80, then processing of the number key itself, i.e., a process such as a figure input or the like is executed (S90). On the other hand, if the answer is YES at S80, then a numeric value inputted via the number key is set as an enlargement magnification to be used for enlargement printing (S100). After the completion of S90 or S100, the routine returns to S20.

If it is judged that the number key has not been operated (if the answer is NO at S70), it is then determined whether the return key 51 has been operated (S110). If the answer is YES at S110, it is then determined whether the enlargement print flag is ON (S120). If the answer is NO at S120, then processing of the return key itself, e.g., a process such as termination of input characters or line feeding or the like is executed (S130). If the answer is YES at S120, then enlargement print processing is executed (S140). After completion of S130 or S140, the routine returns to S20.

If it is judged that the return key 51 has not been operated (if the answer is NO at S110), it is then judged whether processing of other keys, e.g., key operations for the processing of the cursor shift key 50 and the delete key 56 or the like have been performed. Thereafter, the processes corresponding to the key operations are executed (S150) and the routine returns to S20.

The operation related to the enlargement printing based on the main process shown in FIG. 4 will now be described. In order to execute enlargement printing, the enlargement print key 53 is pressed to allow the label producing apparatus 1 to enter into the enlargement magnification setting mode. Next, when a desired enlargement magnification is input via the number key and the return key 51 is pressed, the enlargement printing (S140) can be executed in the set enlargement magnification.

In the other key processing, at S130 in FIG. 4, characters are also inputted in accordance with processing corresponding to operation of the character keys. The enlargement print processing of S140 which executes predetermined editing or the like as needed and is executed after the contents to be printed have been determined, will now be described in detail with reference to flowcharts shown in FIGS. 5A to 6B.

In order to provide an easy understanding of the enlargement print processing, the following description will be made by taking, as an example, a case where the enlargement magnification is set to 3× using a printing tape 5 having a width of 12 mm, with reference to FIGS. 7 and 8.

Figure 5A:
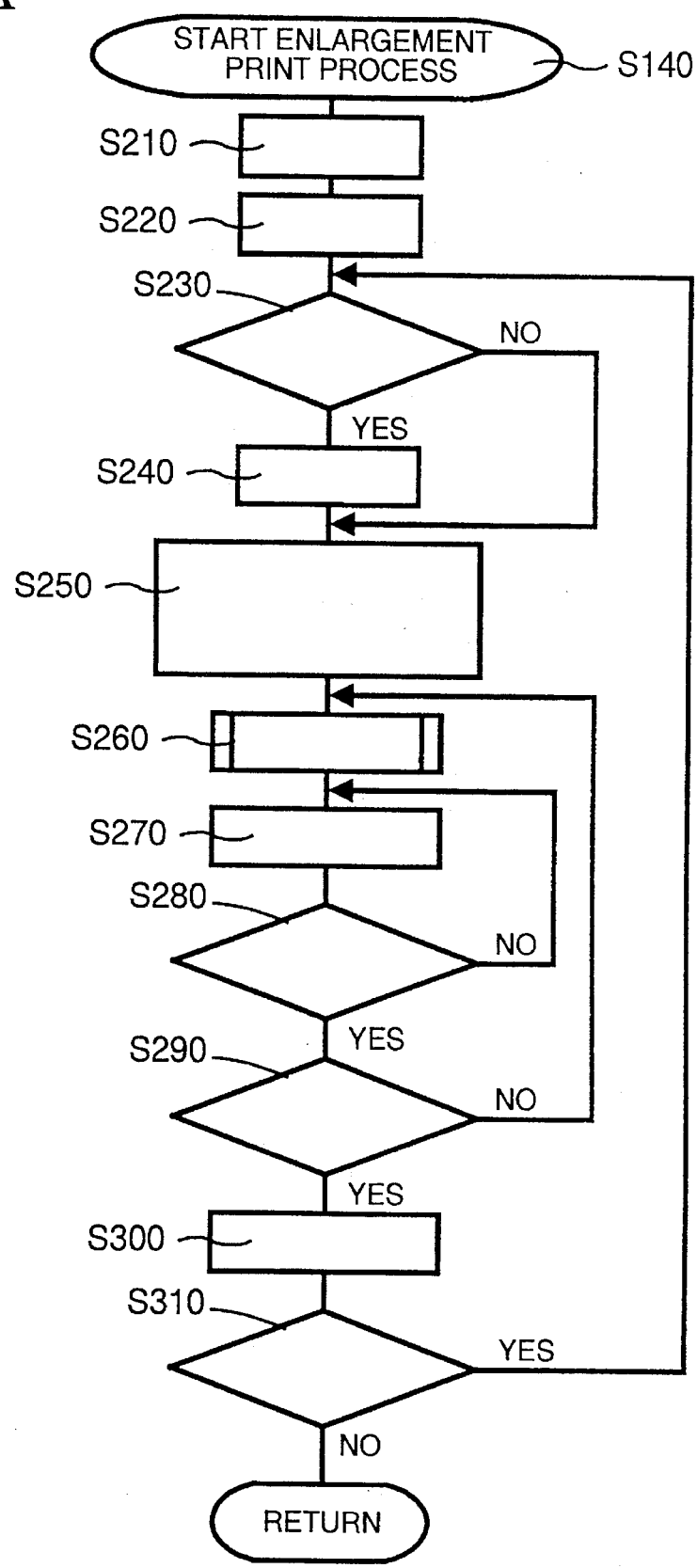
FIG. 5A is a flowchart for describing an enlargement/print processing routine of the main process shown in FIGS. 4A,4B.
Figure 6A:
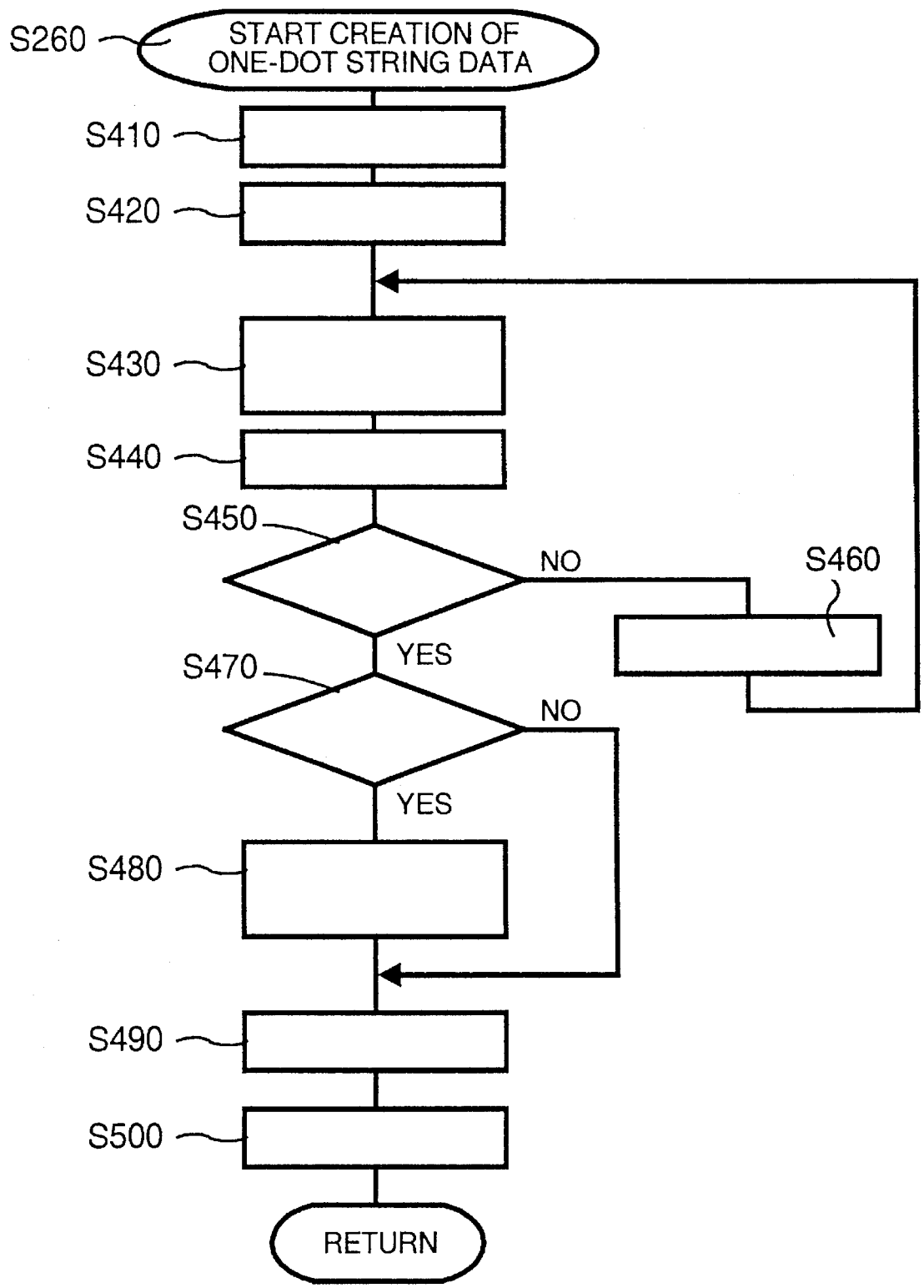
FIG. 6A is a flowchart for describing a one-dot row data generation processing routine in the enlargement print process of FIGS. 5A,5B.

First, print image data is created, (S210) as shown in FIGS. 5A,5B. After an address for each print data has been calculated, the print image data is generated by developing a character font, e.g., developing or expanding a frame font when a frame is in a set state.

Next, the number of lines for the image data intended for execution of enlargement printing is set (S220).

It is determined whether the print image data is intended for the printing of a first segment from the printing tape 5 (S230). If the answer is YES at S230, then the width of the printing tape 5 is identified from the possible types or widths (i.e. one of the five of this embodiment) (S240) and the routine proceeds to S250. If the print image data is found to be intended for the printing of a second segment from the printing tape 5 (if the answer is NO at S230), then the routine procedure proceeds to S250 without executing the processing of S240. This is because once the width of the printing tape 5 is firstly set, (in S230) widths information for the second and subsequent segments from the printing tape 5 can be appropriately used as is.

At S250, data about "the enlargement start bit position," "enlargement end bit position," "enlargement work start bit position 1," "enlargement work start bit position 2" and "the number of shifts for adjustment" are taken from the table of FIG. 7 based on the width of the printing tape 5 and the present number of segments of printing tape to be printed. Thereafter, the taken-out data are set to WORK1 and WORK2 used as two enlargement working areas. When the enlargement magnification is set to 3× using a printing tape 5 having a width of 12 mm, respective data in columns of the first segment from the printing tape 5 at the time that the width of the printing tape 5 is 12 mm and the magnification is 3×, are taken out from the table shown in FIG. 7 and the data are set to WORK1 and WORK2. This is represented by the solid lines in FIG. 8 between WORK1 and WORK2.

Using FIG. 8 as a reference, the way of setting the respective data to WORK1 and WORK2 will now be described. For orientation, consider WORK1 and WORK2 to correspond to the print element array. The marked area of WORK1 is the print area and the marked area of WORK2 is the tape width of the tape on which printing will occur. This is because all tape cassettes have a width that ensures the tape to be printed upon is centered on the thermal head element array. If such was not the case, the lower thermal head elements would be used for all tape widths and the upper thermal head elements would be used only for 24 mm tape.

WORK1 is used for the purpose of capturing and setting print image data as it is, that is, prior to enlargement. The overall height of a dot column of WORK1 corresponds to the number of dots (128 dots set so as to be able to correspond to the maximum width 24 mm of a printing tape 5 in the present embodiment) of the thermal head 13. The image data is set to a predetermined effective printing area. At this time, the image data itself is not yet been read but will be read in accordance with processing of S260 to be described later. Now, only the corresponding "enlargement start bit position" and "enlargement end bit position" are set for the first printing segment for this first variation and for subsequent printing segments during subsequent iterations.

On the other hand, WORK2 is used for the purpose of scaling up the print image data in the predetermined enlargement magnification and setting the scaled up data. First, "the enlargement work start bit position 1" and "the enlargement work start bit position 2" are set to a start position of WORK2. "The enlargement work start bit position 2" is fixed and "the enlargement work start bit position 1" is displaced according to the enlargement magnification. Now, consider a case where the enlargement magnification is 3×, for example. If "the enlargement work start bit position 1" is displaced one bit on the WORK1 side, it corresponds to a bit position where it is displaced every 3 bits corresponding to 3×. "The enlargement work start bit position 2" is used to show a reference position shifted depending on the number of shifts for adjustment, which will be described later. Since, at this time, image data itself is not yet read and hence the image data is not scaled up, only "the enlargement work start bit position 1" and "the enlargement work start bit position 2" are set to the start position of WORK2. "The enlargement work start bit position 1" is displaced depending on the enlargement magnification only upon execution of the processing at S260 to be described later.

The number of shifts for adjustment is used to represent to which bit of enlarged data an enlargement printing upper end corresponds when the data at "the enlargement start bit position" is scaled up.

After the respective data have been set at S250 in this way, one-dot string data is created at S260 and one-dot string printing is executed at S270.

A one-dot string data generating process executed at S260 will be described with reference to FIG. 6. The enlargement work areas WORK1 and WORK2 are first cleared by 16 bytes (corresponding to 128 bits relative to a 128-dot type thermal head 13) (S410) and data corresponding to one line of print image data is then set to WORK1 (S420). Further, data at "the enlargement start bit position," which has been set to WORK1, is scaled up to the set enlargement magnification and is placed from "the enlargement work start bit position 1" (S430). The "enlargement start bit position" at WORK1 is decremented by 1 (S440).

It is then judged whether the data at "the enlargement start bit position" is identical to data at "the enlargement end bit position" (S450). If the answer is NO at S450, then "the enlargement work start bit position 1" on the WORK2 side is reduced by the number of enlargement magnifications (S460). Since "the enlargement start bit position" is decremented by 1 on the WORK1 side if the enlargement magnification is 3 times, for example, "the enlargement work start bit position 1" is decremented by three bits. Thereafter, the routine returns to S430. Accordingly, the processes of S430 through S460 are repeated until "the enlargement start bit position" becomes identical to "the enlargement end bit position" measuring enlargement of a printing segment is complete.

Figure 8:
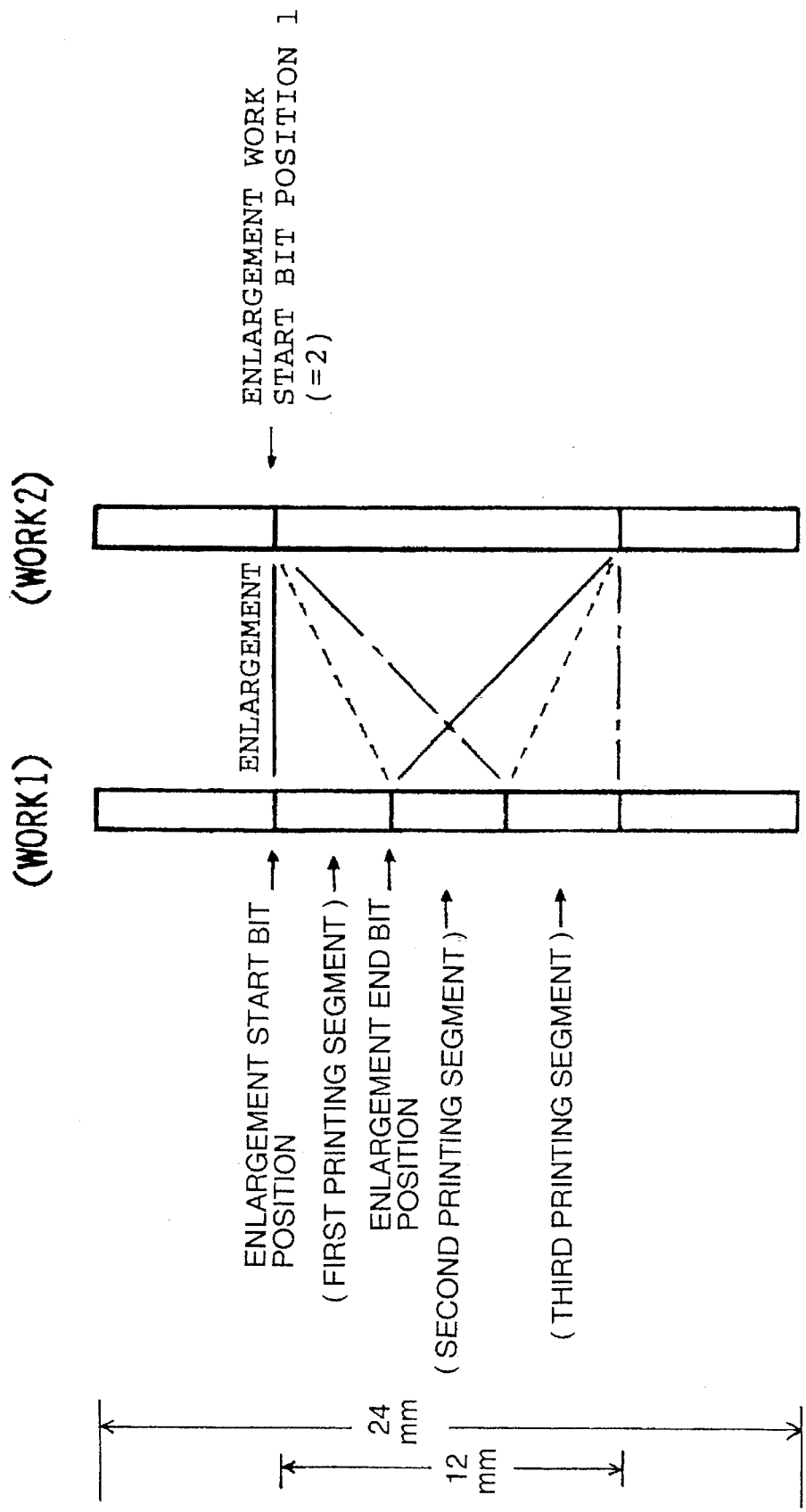
FIG. 8 is a view for describing an enlargement working area at the time of the enlargement printing.

By repeating the processes of S430 through S460 in this way, the image data from "the enlargement start bit position" of a first printing tape 5 to "the enlargement end bit position" thereof, for example, is scaled up as shown in FIG. 8 and is set to WORK2 (the solid lines for the first printing segment).

It is thereafter judged at S470 whether the number of shifts for adjustment is greater than 0. If the answer is YES at S470, then data is shifted from a position where the number of shifts for adjustment is subtracted (reduced) from "the enlargement work start bit position 2" to "the enlargement work start bit position 2" on the WORK2 side (S480).

This shift processing is intended to bring the enlargement printing upper end into alignment with the data, i.e., move to the next print line for enlargement.

If it is judged at S470 that the number of shifts for adjustment is less than or equal to 0, then the routine procedure proceeds to S490 without executing processing of S480 because there are no more print lines to be enlarged.

At S490, areas other than a printing area in WORK2 are all set to "0" data. Thereafter, the data of WORK2 is transferred to the thermal head 13 at S500, after which the present one-dot string data generation processing routine is temporarily terminated. Thereafter, the routine procedure proceeds to the one-dot string printing process of S270 in FIG. 5.

When the one-dot string printing process is executed at S270, it is judged whether a magnification-corresponding loop has been finished (S280). If the answer is NO at S280, then the routine procedure is returned to S270, where the one-dot string printing process is executed again. Namely, if the enlargement magnification is 3×, then the one-dot string printing process at S270 is repeated three times. The one-dot string data created at S260 is repeatedly printed three times.

It is thereafter judged at S290 whether printing has been effected on all the lines corresponding to the number of enlargement printing lines set at S220. If it is judged at S290 that the printing is not yet effected on all the lines (if the answer is NO at S290), then the processes of S260 through S280 are repeated, followed by generation and printing of the next one-dot string data.

When the printing of all the lines is finished (if the answer is YES in S290), the present number of the segment of printing tape 5 is incremented by 1 (S300). It is then judged whether the number of segments of printing tape 5 is less than the enlargement magnification factor (in this example: 3) (S310). If the answer is YES at S310, then the routine returns to S230 where the processes subsequent to S230 are repeated. If a second segment of the printing tape 5 is selected, for example, (as shown by broken lines in FIG. 8) then data about "the enlargement start bit position," "enlargement end bit position, "enlargement work start bit position 1," "enlargement work start bit position 2" and "the number of shifts for adjustment" corresponding to the second segment of the printing tape 5 are taken from the table of FIG. 7 at S250 and are set to WORK1 and WORK2 respectively. Data at WORK1, which ranges from "the enlargement start bit position" corresponding to the second segment of the printing tape 5 to "the enlargement end bit position" corresponding thereto is scaled up, as indicted by the broken lines in FIG. 8, by executing the one-dot string data generating process of FIG. 6 and is set to WORK2, followed by printing. Similarly, if a third segment of the printing tape 5 is selected (as shown by the dash dot lines in FIG. 8), then data at WORK1, which ranges from "the enlargement start bit position" corresponding to the third segment of the printing tape 5 to "the enlargement end bit position" corresponding thereto is scaled up as indicated by dash dot lines in FIG. 8, and is set to WORK2, followed by printing.

On the other hand, if the number of segments of the printing tape 5 reaches the enlargement magnification (if the answer is NO at S310), then the present enlargement print processing routine is finished and the routine procedure is returned to the main process in FIG. 4.

Figure 11:
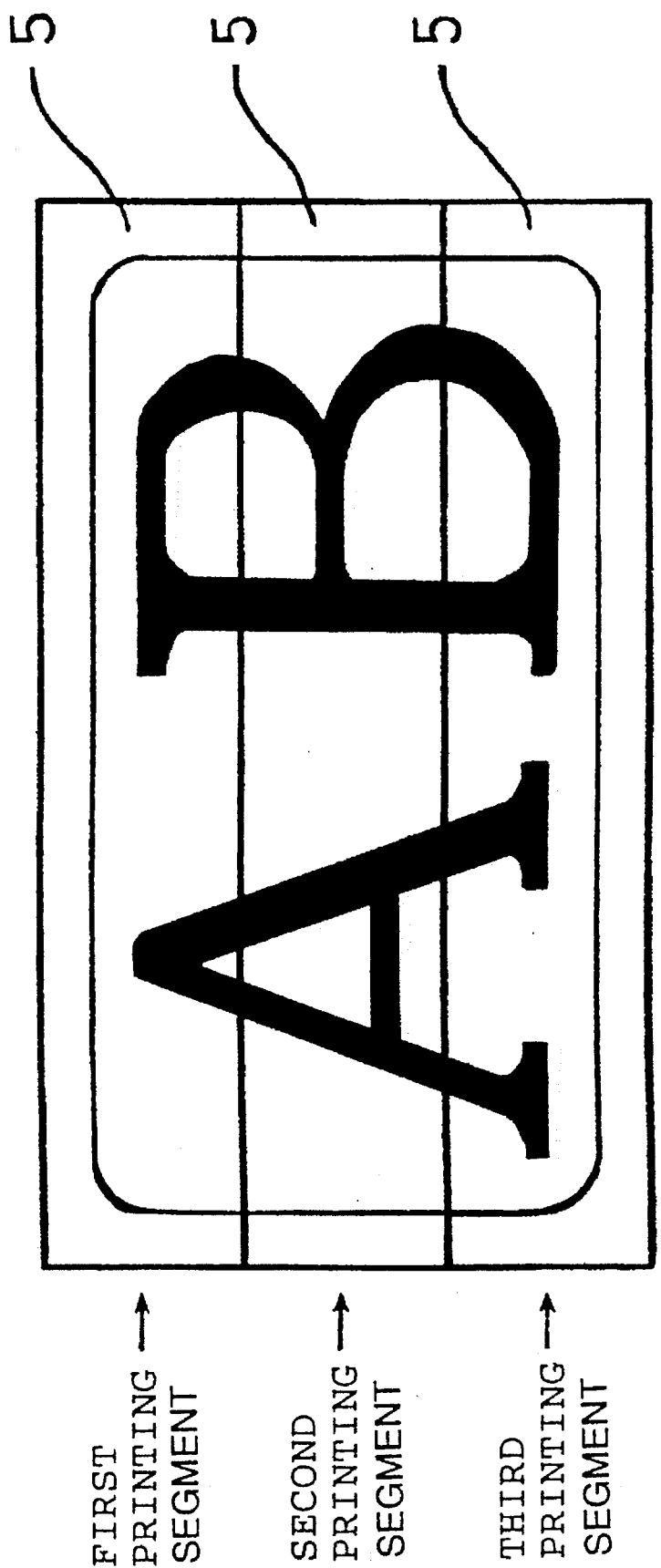
FIG. 11 is a view for explaining one example in which data is printed on a printing tape.
Figure 11A:
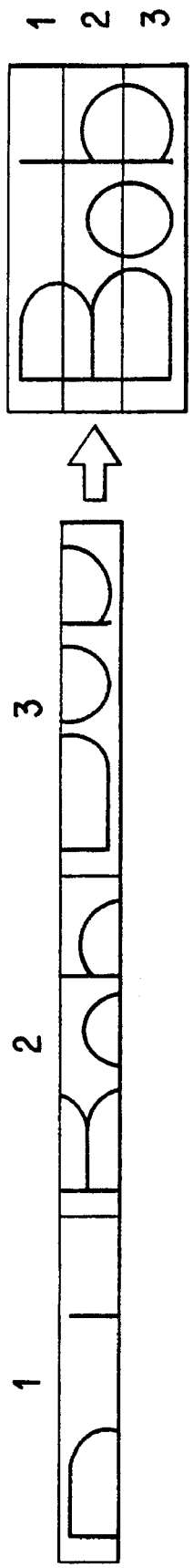
FIG. 11A is a representation of the tape segments as printed and as assembled.

FIG. 11 shows the output of the above example in which the three segments of printing tape 5 on which all the dot strings have been printed, in the above-described manner, are arranged. In this case, the letters of "AB" within a frame are created over the three segments of printing tape 5. The letters of "AB" can be confirmed by the parallel placement of the three segments of printing tape 5. Further, FIG. 11A shows a representation of the tape as it would appear when printed and then as assembled to produce print that is three times the width of the tape.

Thus, when it is desired to create print data corresponding to a tape width of 12 mm, for example and scale up it to 3× magnification, it is necessary to divisionally print the data on three segments (see FIG. 11A) of printing tape 5, each segment from the printing tape having a width of 12 mm, for example, as a printing medium having a width of 36 mm is not found among the five widths of printing mediums identified for this embodiment. Even when the enlarged print data becomes greater than the maximum width of the originally mounted printing medium, the label producing apparatus 1 according to the embodiment can divisionally print in the example, three segments of printing tape 5, which correspond to the enlargement magnification.

The CPU 29 corresponds to a division printing means. However, the routines of S230 through S310 in the enlargement print processing of FIGS. 5A,5B, of the processes executed by the CPU 29, actually constitute processing that comprises the division printing means.

The processes shown in FIGS. 5A,5B and 6A,6B describe one example in which the printing tapes 5 are substantially divisionally-printed by executing enlargement printing. Even when enlargement printing is not performed, the label producing apparatus 1 can divisionally print a plurality of printing tapes 5. An embodiment illustrative of such division printing will be described below.

Other processes at S150 in FIG. 4 include a normal printing process (not corresponding to the enlargement printing process). However, the division printing is executed in some instances even in the case of the normal printing process. If, for example, a printing tape having a width of 24 mm exists where it is desired to create print data printable on the printing tape 5 having the width of 24 mm, then the print data may be printed using such a printing tape. However, even though the 24-mm width printing tape exists, or if it did not exist, the print data can be printed on two segments of 12 mm wide printing tape 5 or four segments of 6 mm wide printing tape 5.

Figure 10:
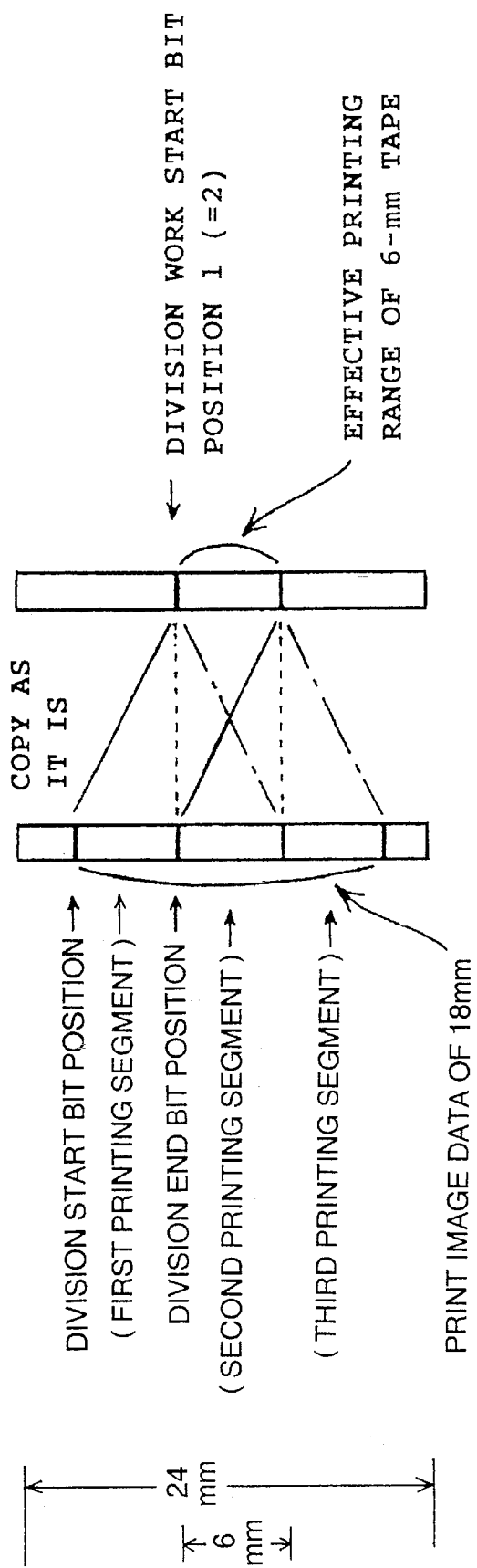
FIG. 10 is a view for describing a division working area at the time of the division printing.

A description will now be provided of another example in which it is desired to create print data normally associated with a printing tape 5 having a width of 18 mm, but the print data is divisionally printed on three segments of a printing tape 5, each segment having a width of 6 mm, with reference to FIG. 10. Since the processing is substantially the same as the above enlargement processing, this processing will be described in the context and with the comparison to processes shown in FIGS. 5A,5B and 6A,6B, citing those processes as necessary.

In a manner similar to S210 and S220, print image data is created and the number of printing lines is set. Next, a decision is made as to the width of a mounted or loaded printing tape 5. For this example, the width of the printing tape 5 is 6 mm. Thus, data about "a division start bit position," "a division end bit position," "division work start bit positions 1, 2" and "the number of shifts for adjustment" corresponding to a first printing segment for a tape width of 6 mm and print data of 18 mm, as shown in the table of FIG. 9, are taken from the table and are set to WORK1 and WORK2 used as the two working areas as shown in FIG. 10.

Upon creation of the one-dot string data, data corresponding to one line of print image data is set to WORK1. Thereafter, the data of "the division start bit position," which has been set to WORK1, is copied as it is and is positioned commencing from "the division work start bit position 1" in WORK2. Further, "the division work start bit position" is also decremented by 1 each time "the division start bit position" in WORK1 is reduced by 1.

Thus, the image data ranging from "the division start bit position" of the first printing tape to "the division end bit position" thereof is copied as it is as indicated by the solid lines in FIG. 10 for the first print segment, and is set to WORK2, followed by printing of the first segment on the printing tape 5 having the width of 6 mm. Similarly, as shown in FIG. 10, the image data ranging from "a division start bit position" of the second segment of the printing tape 5 to "a division end bit position" thereof is copied as it is and is set to WORK2, followed by printing of the segment on the 6-mm width printing tape 5. Further, the image data ranging from "a division start bit position" of the third segment of the printing tape 5 to "a division end bit position" thereof is copied as it is and is set to WORK2, followed by printing on the 6-mm width printing tape 5. Since, in this case, the 18-mm print data is copied as it is, by being divided into three segments from top to bottom (in this embodiment), the number of shifts for adjustment may be normally set to "0."

In this example, in which all the dot strings have been printed on the three segments of the printing tape 5, the result is similar to that shown in FIG. 11. In this case, however, the width of the printing tape 5 is 6 mm.

Since the division printing can be effected according to the width of the printing tape 5, even in the case of the normal printing in this way, the following advantageous effects are achieved.

The embodiment describes the case where the printing tapes 5 having the five widths, such as "6 mm," "9 mm," "12 mm," "18 mm" and "24 mm", can be exchangeably mounted and printed. However, even when print data normally associated with a 24-mm tape width, for example, is frequently created and print data related to other tape widths are not created as often, the printing tapes 5 having the widths other than the 24-mm width can be used for printing. Hence, the printing tapes that might not otherwise be used can be productively used.

As the division printing can be effected using a plurality of segments of the printing tape 5 having widths other than a width fit for the character size to be printed, the printing tapes 5 can be effectively used.

Although the invention has been described as a unitary structure or as one wherein the input means and the print element are connected by a cable, the invention is equally applicable to an input device and a print element, each standing alone (such as shown in FIG. 1A without connecting cable 35). In such a case, it is necessary for the operator to additionally input the width of the tape to which the printing is to be applied, that is, Step S240 of FIGS. 5A,5B, would be input by the operator rather than detected by a sensor. The print data that are created then would be output to a removable storage medium 36, such as a 5¼ inch or a 3½ inch floppy disk. The removable storage medium could then subsequently be mounted into a reading device 38 in a print element having mounted therein a tape cassette containing a tape of the designated size for the printing of the data. Such an embodiment would allow the data to be created on a PC or workstation for use at a different time or place using a portable print element.

Having now fully described the invention, it will be apparent to those skilled in the art that many changes and modifications can be made without departing from the spirit or scope of the invention as set forth herein.

What is claimed is:

1. A label producing apparatus for printing data of a height greater than a width of a print receiving medium, comprising:

character data inputting means for inputting character data including letters, numbers and symbols;

storing means for storing therein the character data input by said character data inputting means;

print image developing means for developing the character data stored in said storing means into print image data;

print receiving medium width identifying means for identifying a width of the print receiving medium; and dividing means for dividing the print image data developed by said print image developing means linearly to create a plurality of segments comprising at least a top segment and a bottom segment relative to the print image data so each segment height corresponds to the width of the print receiving medium.

2. The label producing apparatus according to claim 1, further comprising print means for printing the segments stored in said storing means on the print receiving medium of the identified width.

3. The label producing apparatus according to claim 2, wherein said print means is connected to the label producing apparatus by a cable.

4. The label producing apparatus according to claim 2, wherein the label producing apparatus further comprises a removable memory and said print image data is stored on said removable memory.

5. The label producing apparatus as claimed in claim 4, further comprising print means for printing the print image data from said removable memory.

6. The label producing apparatus according to claim 5, further comprising:

print position information storing means for storing therein print control information for each segment of divided print image data when print data having a predetermined width is segmentally printed on the print receiving medium for each width of the print receiving medium, said dividing means reads the print control information for each segment of print image data divided so as to correspond to the identified width of the print receiving medium from said print position information storing means and said print means prints the print image data on the print receiving medium based on the print control information as a sequence of linear segments.

7. The label producing apparatus according to claim 2, further comprising:

enlargement print specifying means for specifying enlargement printing in an operator determined enlargement magnification; and print position information storing means for storing therein print control information for each segment of divided image data when print data at the time of the enlargement printing in the determined enlargement magnification is segmentally printed on the print receiving medium, wherein said dividing means reads the print control information for each segment of print image data so as to correspond to the identified width of the print receiving medium from said print position information storing means and said print means prints the print image data on the printing medium based on the print control information as a sequence of linear segments.

8. A tape printing apparatus for printing on a tape mounted in a tape cassette, comprising:

an input device that inputs characters for printing, print instructions, and control instructions;

a display that displays the input characters for printing;

a cassette receptacle that holds the mounted tape cassette;

a print element that prints on the tape;

an apparatus housing containing said input device, said display, said cassette receptacle, and said print element;

a memory mounted in said apparatus housing that stores the characters input;

a controller that controls operation of said input device, said display, said print element, and said memory, said controller creating print image data from the input characters and dividing the print image data linearly into at least top and bottom strips for printing on sequential segments of the tape when a height of the print image data is greater than a width of the tape.

9. The tape printing apparatus according to claim 8, further comprising a tape width identifier that identifies a width of the tape in said tape cassette.

10. The tape printing apparatus according to claim 9, wherein said tape width identifier is a detector that identifies the tape width by detecting a type of tape cassette mounted in said cassette receptacle.

11. The tape printing apparatus according to claim 9, wherein said tape width identifier is a tape size switch that indicates the tape width by operation of an operator.

12. The tape printing apparatus according to claim 9, further comprising an enlargement input device that inputs an enlargement factor.

13. The tape printing apparatus according to claim 12, wherein said controller applies the enlargement factor to the print image data to create enlarged print image data.

14. The tape printing apparatus according to claim 13, wherein said enlarged print image data is divided into the at least top and bottom strips by said controller on the basis of the tape width when the enlarged print image height is greater than the tape width as detected by said tape width detector.

15. The tape printing apparatus as claimed in claim 9, further comprising a print position information memory mounted in said apparatus housing that stores therein print control information for each strip of divided print image data, when the print image data is divisionally printed on the tape, for each possible width of a print tape, wherein said controller reads the print control information for each strip of the print image data linearly divided so as to correspond to the width of the tape loaded in said tape printing apparatus from said print position information memory and sequentially prints each strip of the print image data on the loaded tape based on the print control information.

16. The tape printing apparatus according to claim 15, further comprising:

an enlargement print specifying device as part of said input device that specifies enlargement printing in an operator determined enlargement magnification; and a print position information memory mounted in said housing that stores therein print control information for each strip of divided image data when the print image data at the time of the enlargement printing in the determined enlargement magnification is sequentially segmentally printed on the tape in the mounted tape cassette, wherein said controller reads the print control information for each strip of the print image data so as to correspond to the width of the tape in the tape printing apparatus from said print position information memory and prints the strips of print image data on the tape in the sequential segments based on the print control information.

17. The tape printing apparatus according to claim 9, wherein when the input print instructions create at least one character having a height greater than a tape width identified by said tape width identifier, said controller divides said print image data into strips for printing on the sequential segments of the tape.

18. A label producing apparatus exchangeably loading therein print receiving mediums of a plurality of different widths, comprising:

character data inputting means for inputting character data including letters, numbers and symbols;

storing means for storing therein the character data input by said character data inputting means;

print means for printing the character data stored in said storing means on a loaded print receiving medium;

print image developing means for developing the character data stored in said storing means into print image data; and division printing means for linearly dividing the print image data developed by said print image developing means into at least top and bottom segments, each segment corresponding to the width of the print receiving medium loaded in said label producing apparatus and sequentially printing the linearly divided print image data as segments on the corresponding print receiving medium.

19. The label producing apparatus according to claim 18, further comprising print receiving medium width identifying means for identifying a width of the print receiving medium loaded in said label producing apparatus.

20. The label producing apparatus according to claim 18, further comprising:

print position information storing means for storing therein print control information for each segment of linearly divided print image data when print data having a predetermined width is sequentially printed on one of the print receiving mediums for each width of the print receiving mediums, wherein said division printing means reads the print control information for each segment of print image data linearly divided so as to correspond to the width of the print receiving medium loaded in said label producing apparatus from said print position information storing means and prints the linearly divided print image data as sequential segments on the loaded print receiving medium based on the print control information.

* * * * *